US009399150B1

(12) United States Patent
Almutairi

(10) Patent No.: US 9,399,150 B1
(45) Date of Patent: Jul. 26, 2016

(54) FIRE RISK DETECTION, SUPPRESSION, AND COMMUNICATION SYSTEM

(71) Applicant: Umm Al-Qura University, Makkah (SA)

(72) Inventor: Salem Almutairi, Makkah (SA)

(73) Assignee: Umm Al-Qura University, Makkah (SA)

( * ) Notice: Subject to any disclaimer, the term of this patent is extended or adjusted under 35 U.S.C. 154(b) by 0 days.

(21) Appl. No.: 14/698,465

(22) Filed: Apr. 28, 2015

(51) Int. Cl.
*A62C 3/06* (2006.01)
*A62C 3/07* (2006.01)
*G01C 21/34* (2006.01)
*B60Q 5/00* (2006.01)
*A62C 37/10* (2006.01)
*G08G 1/00* (2006.01)
*B60W 40/103* (2012.01)
*G01N 3/30* (2006.01)
*G01N 7/00* (2006.01)

(52) U.S. Cl.
CPC . *A62C 3/065* (2013.01); *A62C 3/07* (2013.01); *A62C 37/10* (2013.01); *B60Q 5/006* (2013.01); *B60W 40/103* (2013.01); *G01C 21/3415* (2013.01); *G01N 3/30* (2013.01); *G01N 7/00* (2013.01); *G08G 1/20* (2013.01)

(58) Field of Classification Search
CPC .......... A62C 3/065; A62C 37/10; A62C 3/07; G01N 3/30; G01N 7/00; G01C 21/3415; B60W 40/109; G08G 1/20; B60Q 5/006
See application file for complete search history.

(56) References Cited

U.S. PATENT DOCUMENTS

| 3,536,260 A | 10/1970 | Volz |
| 3,709,302 A | 1/1973 | Stults |
| 3,738,428 A * | 6/1973 | Ingro .................. A62C 3/06 169/61 |
| 4,019,649 A | 4/1977 | Simon |
| 5,983,962 A * | 11/1999 | Gerardot .............. B60P 3/224 141/231 |
| 8,307,934 B2 | 11/2012 | Rini et al. |
| 8,528,766 B2 | 9/2013 | Huang |
| 2005/0115621 A1 * | 6/2005 | Van Vliet ............. B60P 3/2205 137/899 |

FOREIGN PATENT DOCUMENTS

CN 102815476 A * 12/2012

OTHER PUBLICATIONS

Argyropoulos, et al. "A hazards assessment methodology for large liquid hydrocarbon fuel tanks", Journal of Loss Prevention in the Process Industries 25 (2012) pp. 329-335, https://www.deepdyve.com/lp/elsevier/a-hazards-assessment-methodology-for-large-liquid-hydrocarbon-fuel-tKNkatPkn8.

* cited by examiner

*Primary Examiner* — Rodney Butler
(74) *Attorney, Agent, or Firm* — Oblon, McClelland, Maier & Neustadt, L.L.P.

(57) ABSTRACT

A vehicle-mounted fire control system for safe transport and management of a flammable liquid transported by a vehicle. The system includes a liquid storage vessel having an outer protective wall, a buffer space, and an interior wall. The outer protective wall encloses the buffer space and the interior wall. A rollover sensor measures a roll angle of the liquid storage vessel. An impact sensor measures impact acceleration of the liquid storage vessel. A smoke detector is located inside the buffer space. A fire extinguisher having a plurality of nozzles sprays fire suppressant at least onto one of the outer wall or the interior wall upon command. Electrically actuated solenoids, each one in communication with the nozzles, are configured to automatically open and spray fire suppressant upon the command. A processor programmed to issue the command upon detection of a hazard.

20 Claims, 9 Drawing Sheets

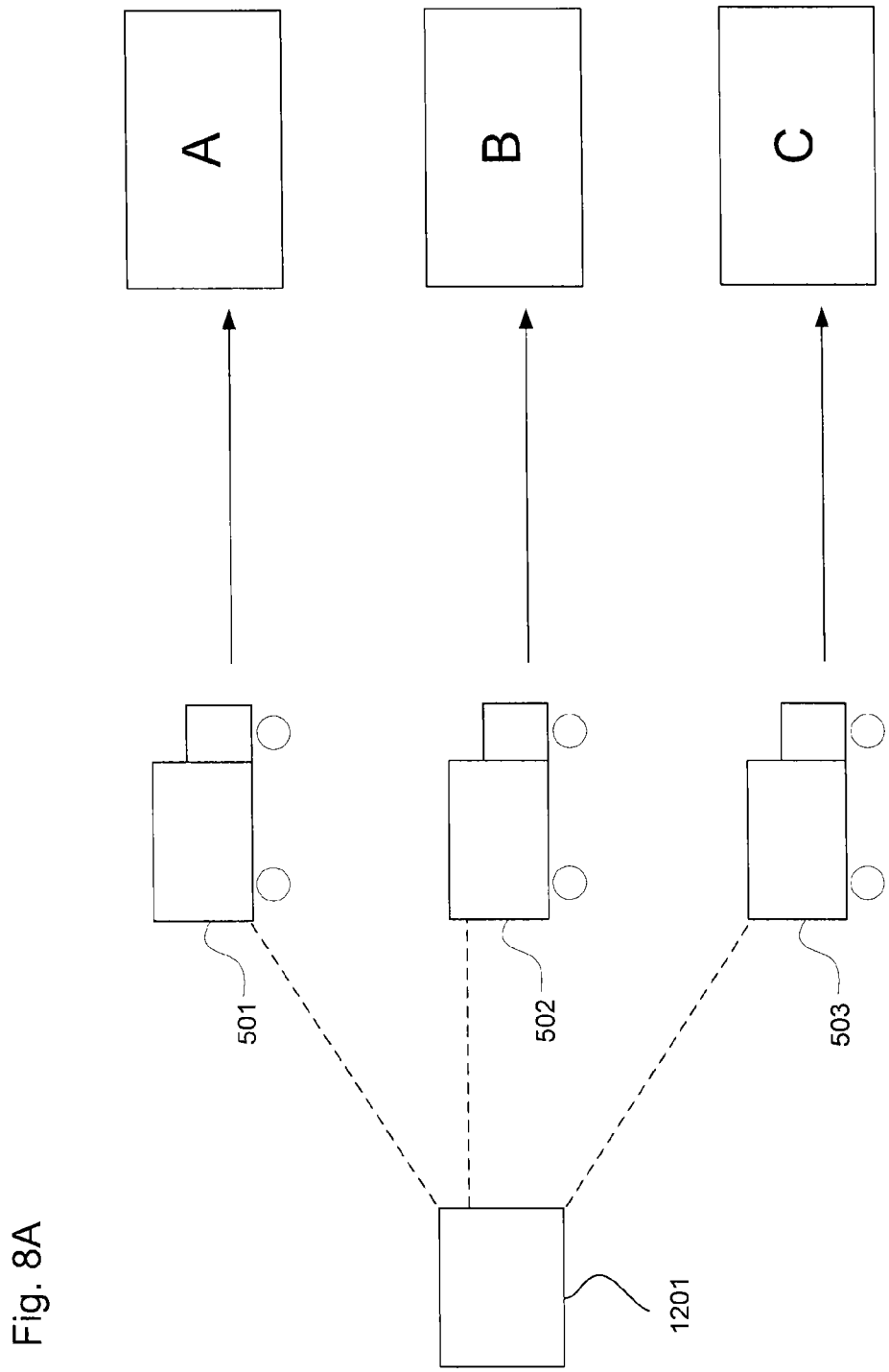

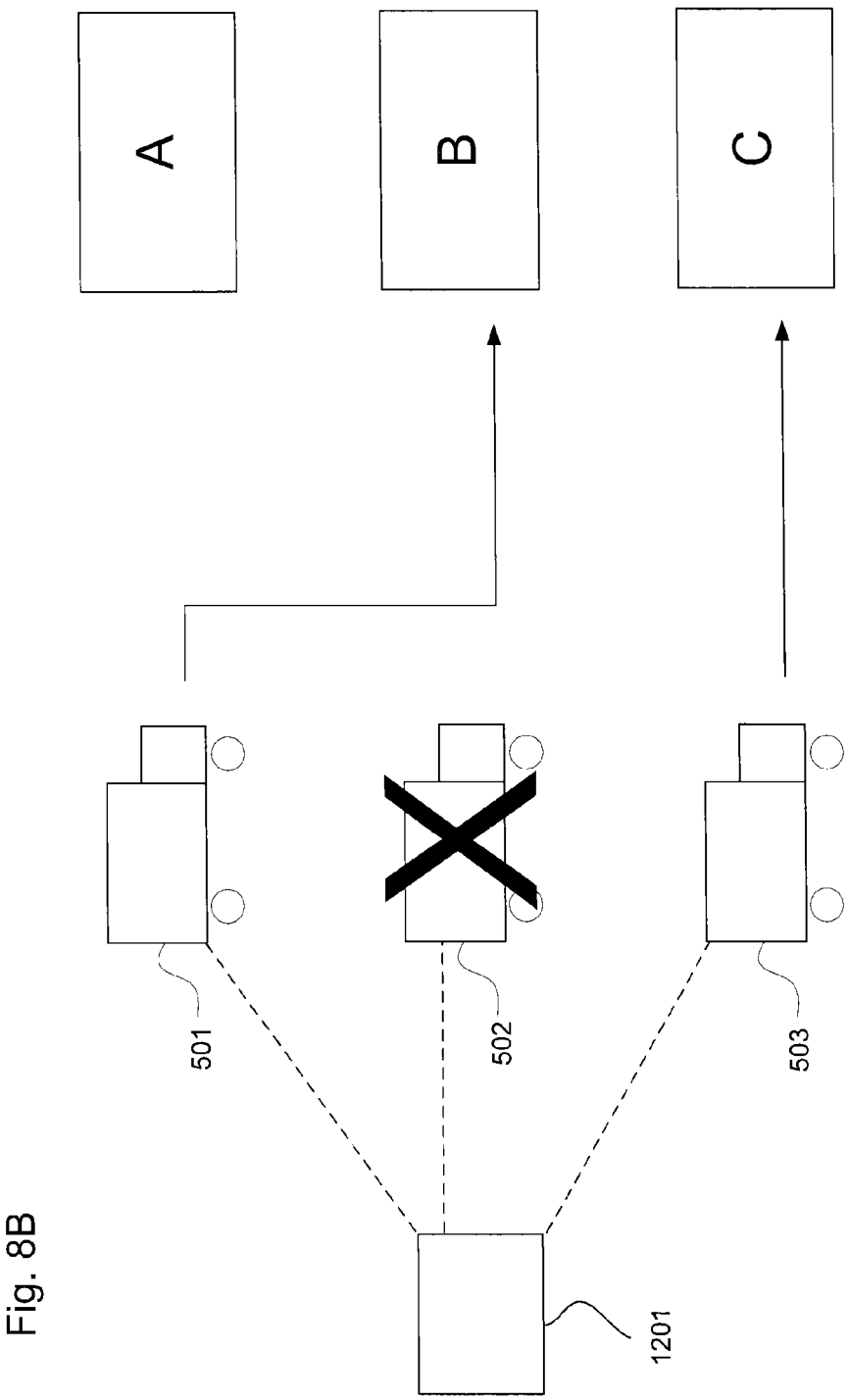

FIRE RISK DETECTION, SUPPRESSION, AND COMMUNICATION SYSTEM

BACKGROUND

1. Field of the Disclosure

The present disclosure relates to fire detection and suppression in containers, generally relating to vehicles equipped with tanks or pressure vessels for transporting liquid and gaseous substances.

2. Description of the Related Art

The risk of fire and explosion in vessels used for storing and transporting flammable bulk liquid or gaseous cargo continues to be of concern due to the large, mobile concentration of energy aboard. For example a truck, railcar or network of railcars loaded with such cargo, is a hazard to public safety if a catastrophic failure were to occur.

Failures include a wide variety of possibilities arising from accidents, equipment malfunction, or combat situations. In the case of accidents, the modes of failure include, for example, collisions with other vehicles or objects that sufficiently damage the storage vessel which holds the liquid or gas, and vehicle rollovers in which the storage vessel strikes the ground or some object near the ground, in such a way to trigger ignition. Equipment malfunction can occur in a variety of ways including failures and leaks from valves, couplings, and structural failures in storage vessels themselves. Furthermore, some vehicles such as those involved in military operations, may be subject to threats such as from enemy fire, and proximity to ordnance, munitions, and other hazards. For these reasons it is important to be able to detect when such vessels are at risk of fire or explosion, and to be able to respond when threats of sufficient severity are detected.

Fire detection and suppression systems that have been used in stationary and mobile applications include the use of fire extinguishing foam with specific applications and the use of automatic cut offs to the vehicle electrical power when catastrophic failures occur.

SUMMARY

In one embodiment, there is provided a vehicle-mounted fire control system for safe transport and management of a flammable liquid transported by a vehicle. The system includes a liquid storage vessel having an outer protective wall, a buffer space, and an interior wall. The outer protective wall is provided which encloses the buffer space and the interior wall. An optional flame screen is disposed between the buffer space and the outside atmosphere. A rollover sensor is provided which measures a roll angle of the liquid storage vessel. An impact sensor is provided which measures impact acceleration of the liquid storage vessel. A smoke detector is provided which is located inside the buffer space. A fire extinguisher is provided having a plurality of nozzles which sprays fire suppressant at least onto one of the outer wall or the interior wall upon command. Electrically actuated solenoids, each one in communication with the nozzles, are configured to automatically open and spray fire suppressant upon the command. A processor is provided in communication with the rollover sensor, the impact sensor, the smoke detector, and the solenoids. The processor is programmed to issue the command upon detection of a hazard.

In one embodiment, there is provided a fleet control system for control of a fleet of delivery vehicles including the vehicle-mounted fire control system (noted above). The fleet control system includes (1) a first data array of cargo scheduled delivery locations, times, and quantities, (2) second data array of the delivery vehicles and respective loads and delivery destinations of the delivery vehicle, and (3) a computer system including the processor (noted above) in communication with a plurality of delivery vehicles, and programmed to update the first data array of delivery vehicles and their respective loads and delivery destinations, and issue revised delivery routing instructions to each vehicle based on changes in an accident or emergency status of any of the vehicles.

It is to be understood that both the foregoing general description of the invention and the following detailed description are exemplary, but are not restrictive of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIGS. 8A and 8B illustrate two conditions of automatic vehicle reprioritization upon detection of vehicle events, according to certain aspects of the disclosure;

DETAILED DESCRIPTION OF THE EMBODIMENTS

Figure 1:
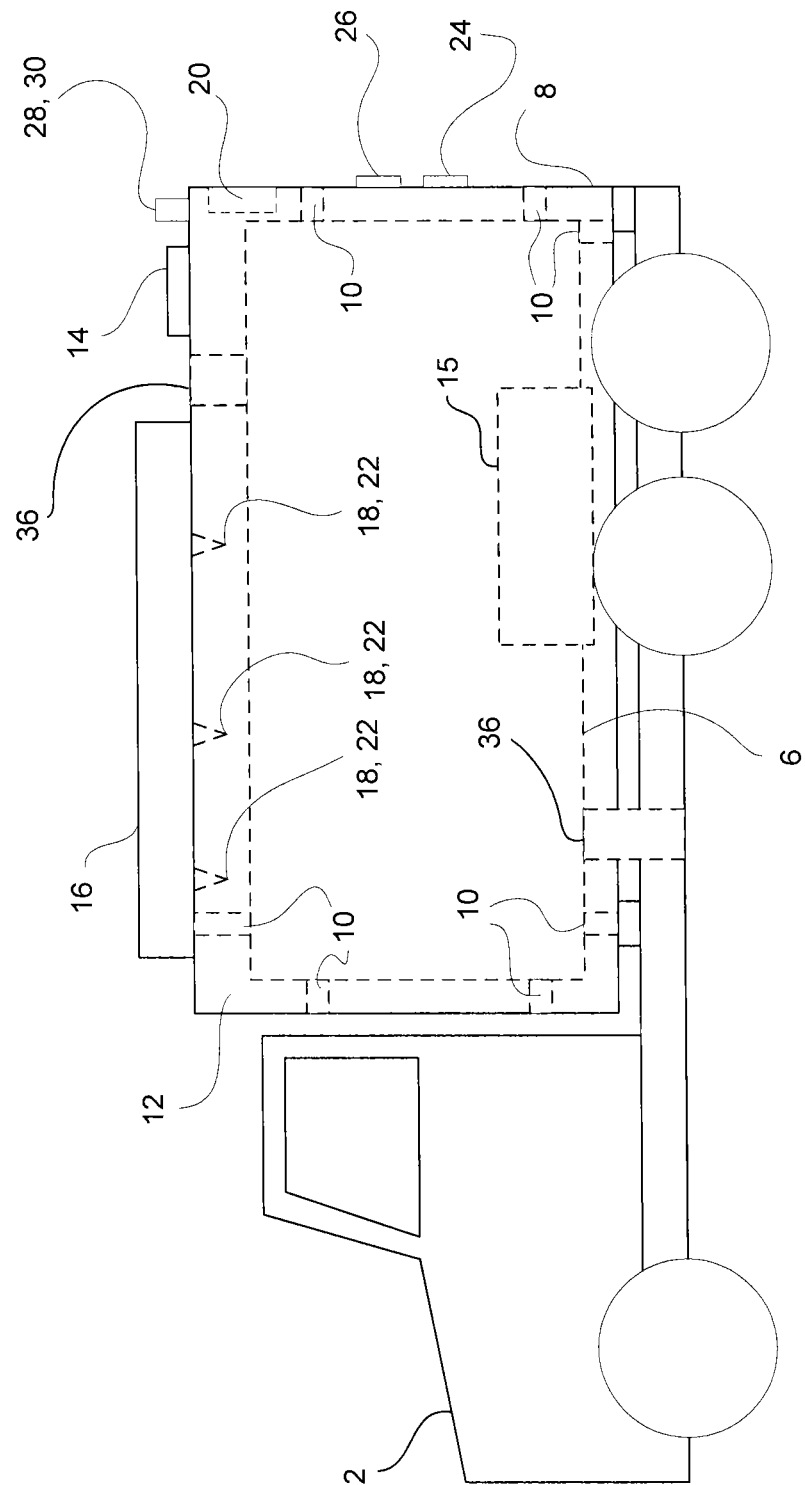
FIG. 1 is a side view of an embodiment of a liquid tanker truck equipped with an impact sensor, a rollover sensor, a smoke detector, and fire prevention and suppressant equipment, according to certain aspects of the disclosure.

The present disclosure is directed to the detection, suppression, and communication of fire risk to emergency response services. Detection of a fire or potential fire entails employing a number of sensors to assess the risk. These include, for example a crash sensor, a rollover sensor, a pressure sensor, and a smoke detector.

Collision type and severity can be determined with a variety of sensors that monitor planar and angular acceleration. Use of sensors or groups of sensors such as a three way array (described by EP0932832A4, the entire contents of which are incorporated herein by reference) in the x-y plane is used to detect direction of impact and to minimize likelihood of unintended emergency action, for example in situations where it is necessary or desirable to trigger different actions based on activity in one axis such as a side impact but not in a frontal impact.

Alternatively, use of both low and high frequency sensors (described by EP0677431A2, the entire contents of which are incorporated herein by reference) also enable reliable detection of crash severity in a given axis.

Further, a rollover sensor (described by WO2000058133 A1, the entire contents of which are incorporated herein by reference) detects an imminent rollover condition. In addition to or in lieu of use of sensor output for deploying vehicle passenger restraint measures, the outputs of said sensors are used to perform functions such as to prompt systems to record data and broadcast alerts to a plurality of recipients by a plurality of methods. The sensors described above each direct the control system to transmit an emergency signal if a predetermined event or threshold is exceeded.

G-force readings above, for example 0.5 g, 1.0 g, 1.5 g, 2.0 g and so forth could be used as threshold decision criteria, above which the system executes a specific sequence of steps and actions. Different decisions can be made which depend on the magnitude of the readings.

Once a sufficient fire risk is detected, a number of fire prevention and suppression actions occur including, for example triggering fire extinguishers, the use of inert gas chambers to isolate the flammable cargo from catalysts, for example oxygen, that may become available due to, for example, a puncture in a pressure vessel wall or from some other source, to the flammable liquid or gaseous cargo.

Further, passive fire prevention and suppression apparatus are also used including, for example a flame screen to minimize the risk of fires spreading and dual or multiple vessel walls for added strength, reducing the likelihood of intrusion into the storage vessel.

The foregoing general description of the illustrative implementations and the following detailed description thereof are merely exemplary aspects of the teachings of this disclosure, and are not restrictive.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Referring now to the drawings, wherein like reference numerals designate identical or corresponding parts throughout the several views.

Figure 2:
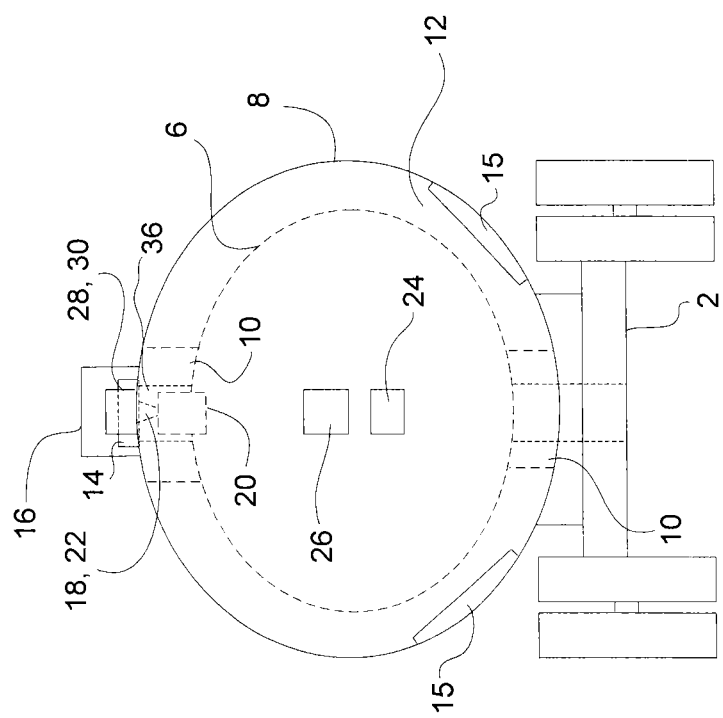
FIG. 2 is a cross section view of an embodiment of a liquid tanker truck equipped with an impact sensor, a rollover sensor, a smoke detector, and fire prevention and suppressant equipment, according to certain aspects of the disclosure.

FIG. 1 is a side view and FIG. 2 is a rear view of an embodiment of a truck 2 equipped with a double walled liquid storage unit 4 to hold and transport liquid cargo. The double walled liquid storage unit 4 is affixed to the truck chassis and comprises a storage vessel 6 and an outer protective wall 8, with a buffer space 12 in between the walls of the storage vessel 6 and the outer protective wall 8. A plurality of vessel supports 10 secures the exterior of the storage vessel 6 to the interior of the outer protective wall 8.

Storage vessel valves 36 disposed on the double walled liquid storage unit 4 provide access for filling and draining liquid from the storage vessel 6.

The buffer space 12, i.e., the hollow volume that separates the storage vessel 6 from the outer protective wall 8, further protects the storage vessel 6 from the external environment and impacts the outer protective wall 8 may be subject to, and provides volume within which to place additional fire protection equipment, for example, an optional flame screen 14 as an added measure of safety. A flame screen can be for example a single screen of corrosion resistant wire of at least 30 by 30 mesh, or for example two screens, both of corrosion resistant wire, of at least 20 by 20 mesh, spaced not less than 12.7 millimeters (0.5 in.) or more than 38.1 millimeters (1.5 in.) apart. More than three screens can be used. The flame screen allows the buffer space 12 to vent to the atmosphere in the event of a fire.

The flame screen 14 reduces the risk of fire spreading should the integrity of the storage vessel 6 be compromised and allows oxygen to enter, for liquid cargo combustion. If a fire occurs in the buffer space 12, the flame screen 14 is designed to absorb heat from a flame, dropping the air/fuel mixture below its automatic ignition temperature threshold and thus suffocating the flame.

Liquid absorbent mats 15 can also be placed in the buffer space 12 to collect any liquid that may spill or leak out of the storage vessel 6 in case of failure, further limiting the amount of spillage that may escape the outer protective wall 8.

Fire suppressant material is stored in a separate, pressurized fire extinguisher reservoir 16 mounted outside the outer protective wall 8. A plurality of fire extinguishing nozzles 18 are disposed at various points on the perimeter of the outer protective wall 8 along the length of the outer protective wall's 8 longitudinal axis inside the buffer space 12, and positioned to channel and spray fire suppressant from the fire extinguisher reservoir 16 toward the exterior of the storage vessel 6, inside the outer protective wall 8.

A smoke detector 20 is located within the buffer space 12 to detect the presence of smoke between the walls of the storage vessel 6 and the outer protective wall 8. If the smoke detector 20 detects the presence of smoke, it opens solenoid valve 22, via an electrical signal, located in each of the fire extinguisher nozzles 18. When the solenoid valves 22 open, the pressurized fire suppressant stored in the fire extinguisher reservoir 16 is discharged through the fire extinguisher nozzles 18 into the buffer space 12 between the storage vessel 6 and the outer protective wall 8.

An impact sensor 24 and a rollover sensor 26 can be affixed to the double walled liquid storage unit 4, for example, to detect collision severity. Any time the impact sensor 24 detects an acceleration above a particular predetermined severity threshold, a collision involving the double walled liquid storage unit 4 is assumed to have occurred. If the impact sensor 24 detects an impact of sufficient severity, that is the impact sensor 24 measures a g-force above a preset threshold (e.g., 0.5 g, 1.0 g, 1.5, 2.0 g, etc.), it activates one or more methods of accident notification and response, such as those described herein.

The rollover sensor 26 detects risk of rollover by comparing its vertical and lateral acceleration with preset thresholds. If the rollover sensor 26 detects a rollover risk of sufficient severity (e.g., the vertical acceleration is at least 0.25, 0.5, 0.75, 1.0, 1.5, 2.0, 2.5. or 3.0 times the lateral acceleration, or the vehicle reaches a tilt angle with the horizontal plane of greater than 30 degrees, etc.), that is the rollover sensor 26 detects a rollover event is occurring, it activates one or more methods of accident notification and response, such as those described herein.

When any of these actions are taken, related event data is recorded to a data processing and storage unit 28 onboard the vehicle and an emergency signal is transmitted by the wireless transmission unit 30 to, for example, a nearby emergency rescue or dispatch center, identifying a fire hazard at the double walled liquid storage unit's 4 location.

Figure 3:
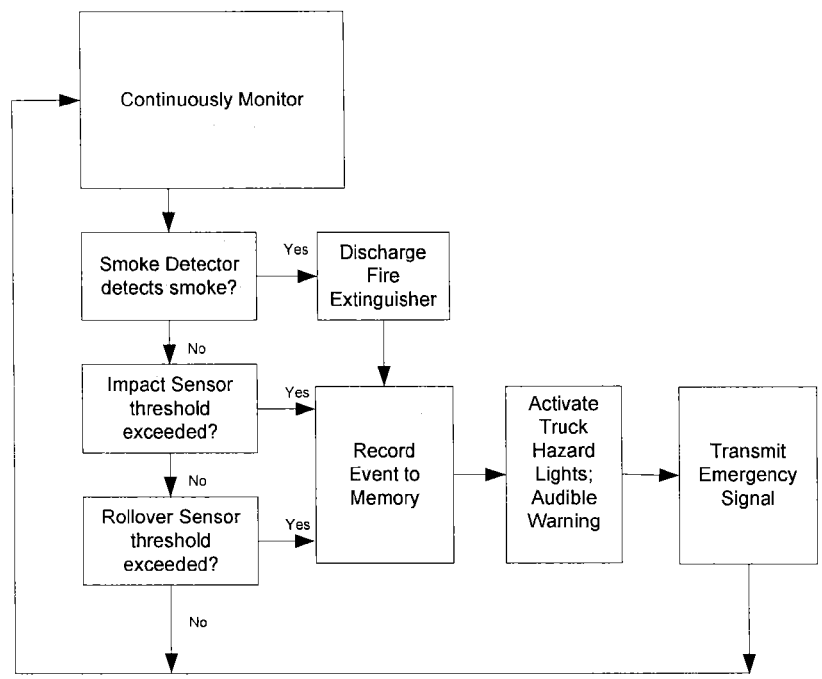
FIG. 3 is a diagram of the process by which the system detects and responds to the risk of fire within the vehicle and liquid storage vessel, according to certain aspects of the disclosure.

FIG. 3 is a diagram of a process by which the system monitors, detects, and responds to the risk of fire and other incidents affecting the truck 2 and the double walled liquid storage unit 4. The rollover sensor 26, impact sensor 24, and smoke detector 20 continually monitor for readings above each sensor's threshold setting.

If at any point the fire extinguisher reservoir 16 is discharged, an impact above the impact threshold of the impact sensor 24 is detected, or the truck 2 is detected by the rollover sensor 26 to have begun to rollover, available data related to the event, for example the time of day and impact severity is recorded to the data processing and storage unit 28 onboard the truck 2, and an emergency signal is wirelessly transmitted to a nearby emergency response resource by the wireless transmission unit 30.

Additionally, transmission of a wireless signal may encompass communication to relay a plurality of predetermined messages or notifications to a plurality of recipients, for example EMS, fleet management and other personal or emergency contacts, through a nearby mobile device such as that of the driver, configured to communicate with the vehicle communication network.

In one embodiment, in the case that the fire extinguisher reservoir 16 is discharged the truck's 2 hazard lights and/or audible warnings may automatically be activated to signal emergency services and other people nearby of a safety risk.

Figure 4:
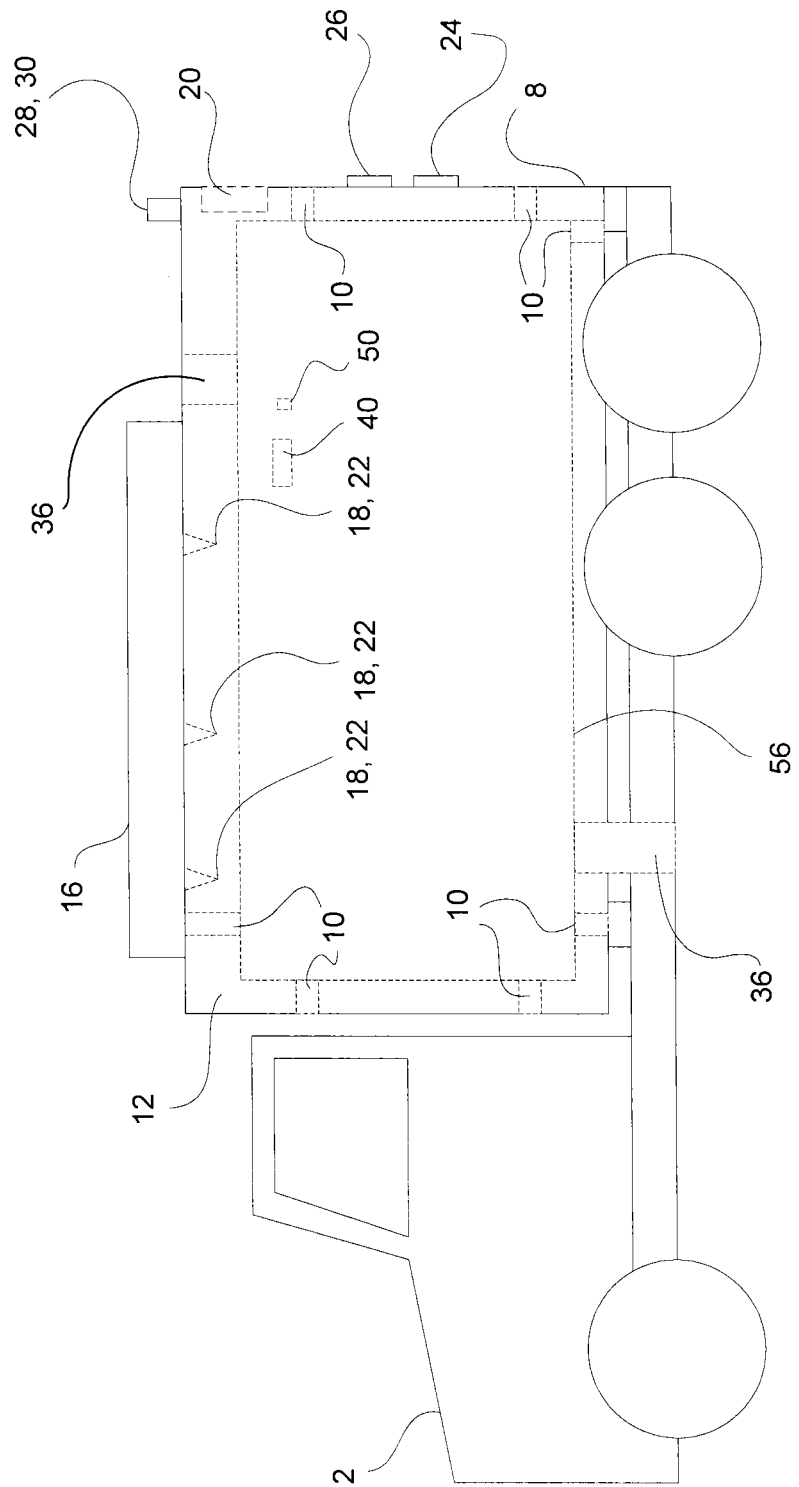
FIG. 4 is a side view of an embodiment of a gas tanker truck equipped with an impact sensor, a rollover sensor, a pressure sensor, a smoke detector, and fire prevention and suppressant equipment, according to certain aspects of the disclosure.
Figure 5:
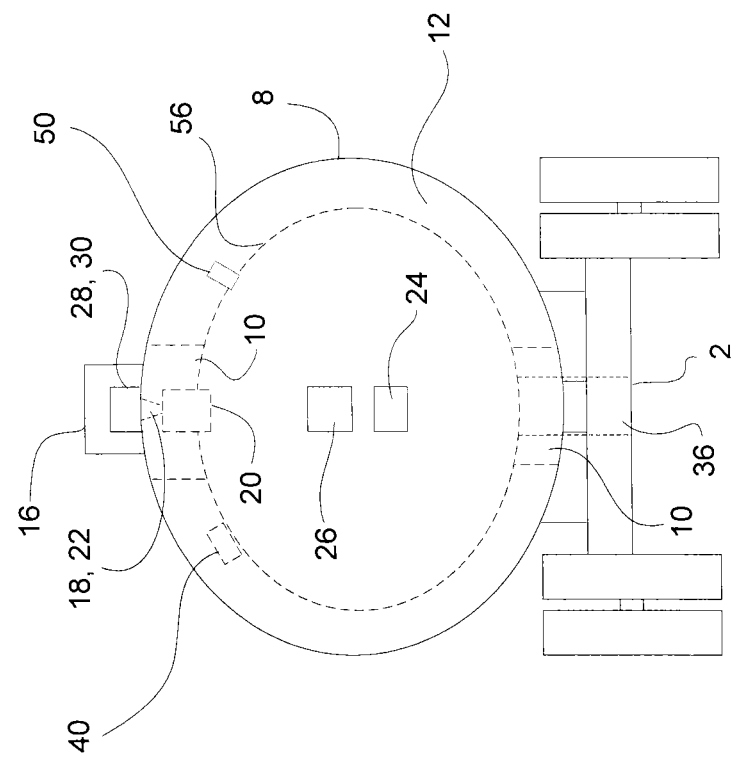
FIG. 5 is a cross section view of an embodiment of a gas tanker truck equipped with an impact sensor, a rollover sensor, a pressure sensor, a smoke detector, and fire prevention and suppressant equipment, according to certain aspects of the disclosure.

FIG. 4 is a side view and FIG. 5 is a rear view of an embodiment of a truck 2 equipped with a double walled gaseous storage unit 54 to hold and transport gaseous cargo. The double walled gaseous storage unit 54 is affixed to the truck 2 chassis and comprises a pressure vessel 56 and an outer protective wall 8, with an empty buffer space 12 in between the walls of the pressure vessel 56 and the outer protective wall 8. A plurality of vessel supports 10 secure the exterior of the pressure vessel 56 to the interior of the outer protective wall 8.

Pressure vessel valves 38 disposed on the double walled gaseous storage unit 54 provide access for filling and emptying gas from the pressure vessel 56.

As in the previous embodiment, the buffer space 12, i.e., the hollow volume that separates the pressure vessel 56 from the outer protective wall 8, further protects the pressure vessel 56 from the external environment and impacts the outer protective wall 8 may be subject to, and provides volume within which to place additional fire protection materials, for example, pressurized inert gas to further isolate the contents of the pressure vessel 56 in the event of a fire. The buffer space 12 is closed to the atmosphere in order to contain pressurized inert gas and, in the event of a fire, to contain the inert and flammable gas mixture, should the integrity of the pressure vessel 56 be compromised.

As in the previous embodiment, fire suppressant material is stored in a separate, pressurized fire extinguisher reservoir 16 mounted outside the outer protective wall 8. A plurality of fire extinguishing nozzles 18 are disposed at various points on the perimeter of the outer protective wall 8 along the length of the outer protective wall's 8 longitudinal axis inside the buffer space 12, and positioned to channel and spray fire suppressant from the fire extinguisher reservoir 16 toward the exterior of the pressure vessel 56, inside the outer protective wall 8.

As in the previous embodiment, a smoke detector 20 can be located within the buffer space 12 to detect the presence of smoke between the walls of the pressure vessel 56 and the outer protective wall 8. If the smoke detector 20 detects the presence of smoke, it opens a closed solenoid valve 22, via an electrical signal, located in each of the fire extinguisher nozzles 18. When the solenoid valves 22 open, the pressurized fire suppressant stored in the fire extinguisher reservoir 16 is discharged through the fire extinguisher nozzles 18 into the buffer space 12 between the pressure vessel 56 and the outer protective wall 8.

Pressurized inert gas is stored in the surrounding buffer space 12. An emergency solenoid 50 is located on the pressure vessel 56, disposed so as to separate the pressure vessel 56 from the buffer space 12. Under normal operating conditions the emergency solenoid 50 remains in the closed position. A pressure sensor 40 can be located inside the pressure vessel 56 and continually monitors and detects if pressure inside the pressure vessel 56 is changing. A pressure sensor 42 can be located inside the buffer space 12 and continually monitors and detects if pressure inside the buffer space 12 is changing. Rising pressure in the pressure vessel 56 and falling pressure in the buffer space 12 indicates the potential risk of detonation of the gas contained in the pressure vessel 56.

If the pressure sensor 40 detects that the pressure of the gas in the pressure vessel 56 rises above a certain predetermined pressure, or the pressure sensor 42 detects that the pressure of the buffer space 12 falls below a certain predetermined pressure, the emergency solenoid 50 receives an electrical signal to open, equalizing the internal pressures between the pressure vessel 56 and the pressure of the buffer space 12, allowing the gas from within the pressure vessel 56 to blend with the inert gas in the buffer space 12. While the overall pressure of the pressure vessel 56 may then increase by some amount, depending on the initial pressure of the inert gas contained in the buffer space 12 and the volume of the buffer space 12 as a function of the volume of the pressure vessel 56, once a sufficiently high volumetric concentration of the inert gas is achieved in the combined mixture of the total gaseous content within the pressure vessel 56 and buffer space 12, the risk of detonation is significantly reduced or altogether neutralized.

As in the previous embodiment, an impact sensor 24 and a rollover sensor 26 can be affixed to the double walled gaseous storage unit 54, for example, to detect collision or rollover severity. Any time the impact sensor 24 detects acceleration above a particular predetermined severity threshold, a collision involving the double walled gaseous storage unit 54 is assumed to have occurred. If the impact sensor 24 detects an impact of sufficient severity, that is the impact sensor 24 measures a g-force above a preset threshold (e.g., 0.5 g, 1.0 g, 1.5 g, 2.0 g, etc.), it activates one or more methods of accident notification and response, such as those described herein.

The rollover sensor 26 detects risk of rollover by comparing its vertical and lateral acceleration with preset thresholds. If the rollover sensor 26 detects a rollover risk of sufficient severity (e.g., the vertical acceleration is at least 0.5, 1.0, 1.5, 2.0, 2.5. or 3.0, etc. times the lateral acceleration), that is the rollover sensor 26 detects a rollover event is occurring, it activates one or more methods of accident notification and response, such as those described herein.

When any of these actions are taken, related event data is recorded to a data processing and storage unit 28 onboard the vehicle and an emergency signal is transmitted by the wireless transmission unit 30 to, for example, a nearby emergency rescue or dispatch center, identifying a fire hazard at the double walled gaseous storage unit's 54 location.

Figure 6:
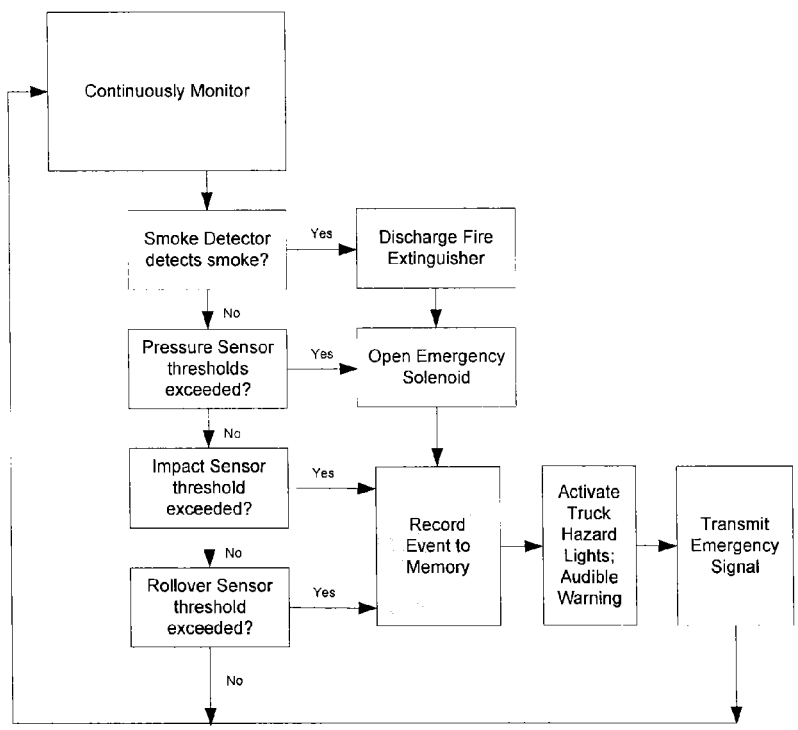
FIG. 6 is a diagram of the process by which the system detects and responds to the risk of fire within the vehicle and pressure vessel, according to certain aspects of the disclosure.

FIG. 6 is a diagram of a process by which the system monitors, detects, and responds to the risk of fire and other incidents affecting the truck 2 and the double walled gaseous storage unit 54. The rollover sensor 26, impact sensor 24, pressure sensor 40, and smoke detector 20 continually monitor for readings above each sensor's threshold setting.

If at any point, 1) the fire extinguisher reservoir 16 has been discharged, 2) the truck as detected by the rollover sensor 26 has begun to rollover, 3) an impact above the impact threshold of the impact sensor 24 has been detected, or 4) a pressure in the pressure vessel 56 has risen above the preset threshold of the pressure sensor 40, available data related to the event, for example, the time of day, impact severity and pressure vessel 56 pressure is recorded to the data storage unit 28 onboard the truck 2, and an emergency signal is wirelessly transmitted to a nearby emergency response resource by the wireless transmission unit 30.

Similar to the variations of the processes of FIG. 3, the operations of the preferred embodiments of the process of FIG. 6 also may vary in their order.

Figure 7:
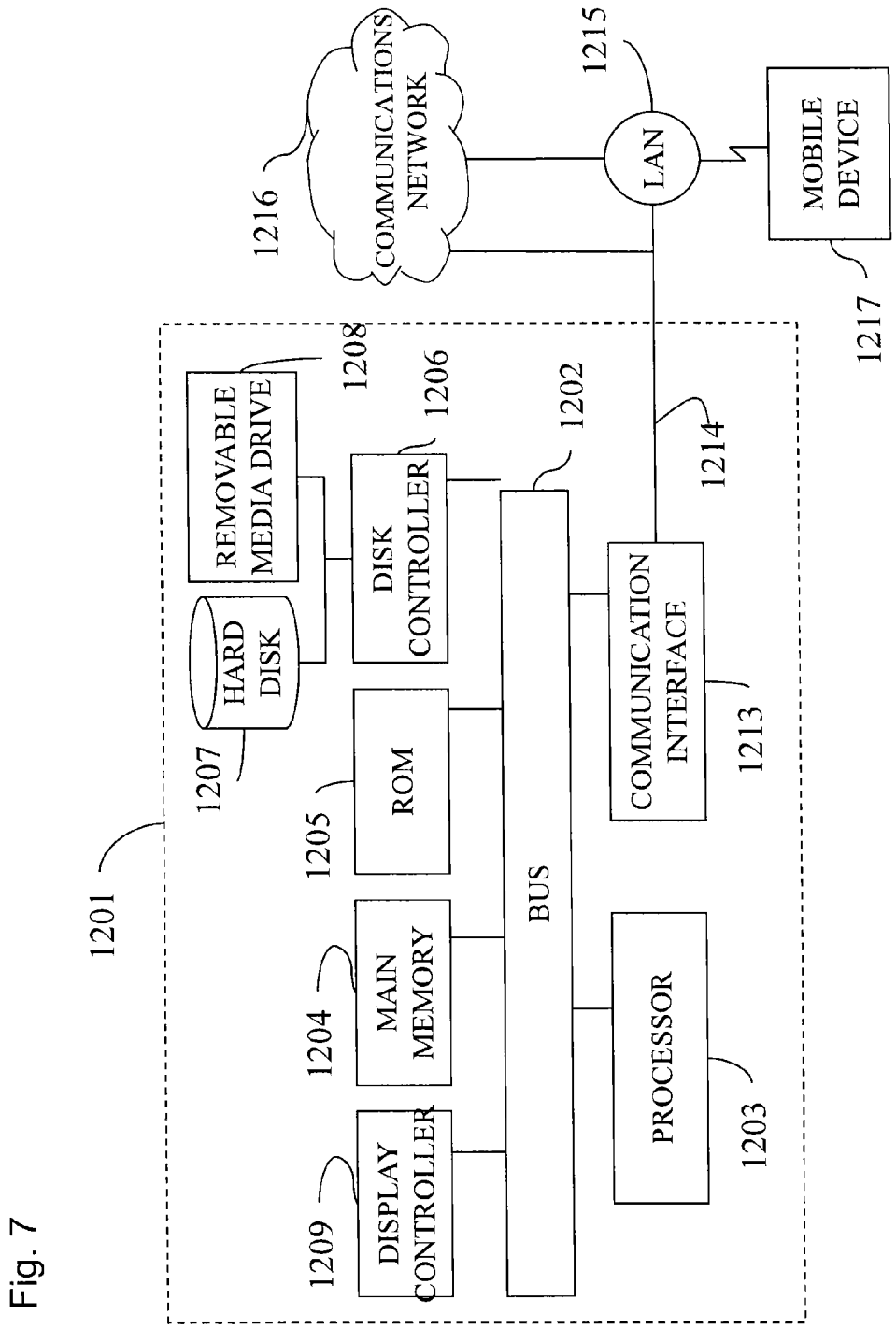
FIG. 7 is a diagram of a computer system and network, according to certain aspects of the disclosure.

FIG. 7 illustrates one embodiment of a computer system 1201 in which the data processing and storage unit 28 (or any of the specific processors discussed below) of the invention can be implemented. The computer system 1201 is programmed and/or configured to perform any or all of the functions described above by way of the description of the algorithmic flowcharts depicted in FIGS. 3 and 6. Further, respective functions can be divided among different computers on board the vehicle. These computers may be in communication with each other via the communications network 1216 (discussed below). The computer system 1201 includes a bus 1202 or other communication mechanism for communicating information, and an internal processor 1203 coupled with the bus 1202 for processing the information. The computer system 1201 includes a memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by the internal processor 1203. In addition, the memory 1204 may be used for storing temporary variables or other intermediate information during the execution of instructions by the internal processor 1203. The computer system 1201 preferably includes a non-volatile memory such as for example a read only memory (ROM) 1205 or other static storage device (e.g., programmable ROM (PROM), erasable PROM (EPROM), and electrically erasable PROM (EEPROM)) coupled to the bus 1202 for storing static information and instructions for the internal processor 1203.

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). The computer system may also include one or more digital signal processors (DSPs) such as the TMS320 series of chips from Texas Instruments, the DSP56000, DSP56100, DSP56300, DSP56600, and DSP96000 series of chips from Motorola, the DSP1600 and DSP3200 series from Lucent Technologies or the ADSP2100 and ADSP21000 series from Analog Devices. Other processors especially designed to process analog signals that have been converted to the digital domain may also be used (as detailed in the working example below).

The computer system 1201 performs a portion or all of the processing steps of the invention in response to the internal processor 1203 executing one or more sequences of one or more instructions contained in a memory, such as the main memory 1204. Such instructions may be read into the main memory 1204 from another computer readable medium, such as a hard disk 1207 or a removable media drive 1208. Such instructions may be read into the main memory 1204 from another computer readable medium, such as a USB flash drives or jump drives. Such drives are solid-state memory devices which have the ability to act as floppy disks or hard drives under most computer operating systems. One or more processors in a multi-processing arrangement may also be employed to execute the sequences of instructions contained in main memory 1204. In alternative embodiments, hardwired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media suitable for the invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, or any other medium from which a computer can read.

Stored on any one or on a combination of computer readable media, the invention includes software for controlling the computer system 1201, for driving a device or devices for implementing the invention, and for enabling the computer system 1201 to interact with a human user (e.g., a driver). Such software may include, but is not limited to, device drivers, operating systems, development tools, and applications software. Such computer readable media further includes the computer program product of the invention for performing all or a portion (if processing is distributed) of the processing performed in implementing the invention. The computer code devices of the invention may be any interpretable or executable code mechanism, including but not limited to scripts, interpretable programs, dynamic link libraries (DLLs), Java classes, and complete executable programs. Moreover, parts of the processing of the invention may be distributed for better performance, reliability, and/or cost.

The term "computer readable medium" as used herein refers to any medium that participates in providing instructions to the internal processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

The computer system 1201 also includes a communication interface 1213 coupled to the bus 1202. The communication interface 1213 provides a two-way data communication for example to wireless transmission unit 30 for coupling to a radio or mobile network, or to a network link 1214 that is connected at least temporarily to, for example, a local area network (LAN) 1215, or to another communications network 1216 such as the Internet during downloading of software to the processor 24 or an internal network between multiple computers on board the vehicle. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented as part of the communication interface 1213 to provide data exchange between any of the on-board computers and the rollover sensor 26, impact sensor 24, pressure sensor 40, and smoke detector 20, and/or driver command input devices on the vehicle. In any such implementation, the communication interface 1213 sends and receives electrical, electromagnetic or optical signals that carry digital data streams representing various types of information.

The network link 1214 typically provides data communication through one or more networks to other data devices to provide the data exchange noted above. For example, the network link 1214 may provide a temporary connection to another computer through a local network 1215 (e.g., a LAN) or through equipment operated by a service provider, which provides communication services through a communications network 1216. As shown in FIG. 7, the computing system 1201 can be in communication with a mobile device 1217 via the local network 1215 and the communications network 1216 which use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to the various GPS and INS systems on board the vehicle. The input device 1217 in various embodiments of the invention provides input to the processor 24 and represents schematically the and the rollover sensor 26, impact sensor 24, pressure sensor 40, and smoke detector 20, and/or driver command input devices discussed in the invention.

FIG. 8A illustrates the process of automatic vehicle reprioritization upon detection of an accident involving one truck in a fleet of trucks. Three trucks 501, 502, and 503 are transporting cargo to three delivery locations A, B, and C, respectively, and are in wireless communication with a computer system 1201.

The computer system 1201 contains data about delivery locations, times, and quantities that must be delivered, as well as data about each of the vehicles it is in communication with, and each vehicle's respective cargo payload, delivery destination.

If the computer system 1201 detects, for example, truck 502 has an accident or other emergency, it will update the available information and reprioritize deliveries based on the latest information to maintain delivery schedules with minimal disruption.

FIG. 8B illustrates the revised delivery process that is executed by the computer system 1201 to automatically and instantaneously update the available inventory of vehicles and fuel in transit for the fleet, reprioritize deliveries based on client criteria, and reroute trucks for some preselected time horizon, for example a day or week, as needed to minimize supply disruption, based upon detection of an incident involving any of a fleet's fuel trucks that exceed a collision threshold.

While described herein with reference to trucks, the invention is equally applicable to train containers transporting flammable cargo. The above descriptions are therefore applicable for flammable train containers being moved by rail where the components described above would be applicable. Similarly, the components described above would be applicable boat shipping containers.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

GENERALIZED STATEMENTS OF THE INVENTION

The following statements provide a general description of the invention and are not intended to limit the appended claims.

(1) A vehicle-mounted fire control system for safe transport and management of a flammable liquid transported by a vehicle, comprising: a liquid storage vessel having an outer protective wall, a buffer space, and an interior wall; said outer protective wall enclosing the buffer space and the interior wall; an optional flame screen disposed between the buffer space and the outside atmosphere; a rollover sensor which measures a roll angle of the liquid storage vessel; an impact sensor which measures impact acceleration of the liquid storage vessel; a smoke detector located inside the buffer space; a fire extinguisher having a plurality of nozzles configured to spray fire suppressant at least onto one of the outer wall or the interior wall upon command; electrically actuated solenoids, each one in communication with the nozzles, configured to automatically open and spray fire suppressant upon the command; and a processor in communication with the rollover sensor, the impact sensor, the smoke detector, and the solenoids and programmed to issue the command upon detection of a hazard (e.g., fire or safety hazard).

As an alternative or in supplementation to statement (1), (1a) A vehicle-mounted fire control system for safe transport and management of a flammable liquid transported by a vehicle, comprising: a liquid storage vessel having an outer protective wall, a buffer space, and an interior wall; said outer protective wall enclosing the buffer space and the interior wall; at least one sensor which detects an abnormal state of the vehicle or the liquid storage vessel; a fire suppressant supply which sprays fire suppressant at least onto one of the outer wall or the interior wall upon command; and a processor in communication with the at least one sensor, and programmed to issue the command upon detection of an abnormal condition (e.g., hazard, fire or safety hazard, roll over alert, impact, outer wall puncture, interior wall puncture, loss of pressure in the storage vessel, etc.).

(2) The system of (1), wherein the processor determines if respective thresholds of the rollover sensor, the impact sensor, or the smoke detector are exceeded; and issues said command upon exceeding any of the respective thresholds.

(3) The system of (2), wherein the roll-over sensor measures vertical and lateral accelerations of the vehicle.

(4) The system of (3), wherein a rollover threshold of the rollover sensor comprises the vertical acceleration comprising at least one of 0.5, 1.0, 1.5, 2.0, 2.5, or 3.0 times the lateral acceleration.

(5) The system of (3), wherein the impact sensor measures an acceleration of the vehicle.

(6) The system of (5), wherein an impact threshold of the impact sensor comprises at least one of 0.5 g, 1.0 g, 1.5 g, or 2.0 g.

(7) The system of (1), further comprising a pressurized inert gas source in fluid communication with the buffer space.

(8) The system of (1), further comprising a pressure sensor which senses an internal pressure of the liquid storage vessel, wherein the processor determines if a pressure threshold of the pressure sensor is exceeded; and issues said command upon exceeding the pressure threshold.

(9) The system of (1), wherein the processor comprises at least one of:
a data recording unit that saves sensor data to memory,
an audio broadcast system with prerecorded warning messages, and
a communication unit that automatically transmits sensor data to outside networks and locations upon issuance of said command.

(10). The system of (1), wherein the processor is programmed with an algorithm which upon execution performs at least one of the following functions:
monitors the storage vessel for fire risk with a smoke detector, wherein if a fire is detected the fire extinguisher is discharged and the event is recorded to hard memory;
monitors the storage vessel for crash impact, wherein if a g-force threshold of at least 1.0 g, 1.5 g, or 2.0 g is exceeded, the event is recorded to hard memory;
monitors the storage vessel for rollover, wherein if a g-force threshold of at least 0.5 g 1.0 g, 1.5 g, or 2.0 g is exceeded, the event is recorded to hard memory;
activates the vehicle's hazard lights;
broadcasts an audible warning to the driver and bystanders outside the vehicle;
transmits an emergency signal to a plurality of recipients when a fire, crash or rollover event is recorded to hard memory.

(11) The system of (1), wherein the processor is programmed with an algorithm which upon execution performs at least one of the following functions:
monitors the storage vessel for fire risk with a smoke detector, wherein if a fire is detected the fire extinguisher is discharged, an emergency pressure relief solenoid is activated and the event is recorded to hard memory;
monitors the storage vessel for explosive risk with a pressure sensor, wherein if the internal pressure inside the storage vessel reaches a predetermined threshold, an emergency pressure relief solenoid is activated and the event is recorded to hard memory;
monitors the storage vessel for crash impact, wherein if a g-force threshold of at least 1.0 g, 1.5 g, or 2.0 g is exceeded, the event is recorded to hard memory;
monitors the storage vessel for rollover, wherein if a g-force threshold of at least 0.50 g, 1.0 g, 1.5 g, or 2.0 g is exceeded, the event is recorded to hard memory;
activates the vehicle's hazard lights;
broadcasts an audible warning to the driver and bystanders outside the vehicle;
transmits an emergency signal to a plurality of recipients if a fire, crash or rollover event is recorded to hard memory.

(12) A fleet control system for control of a fleet of delivery vehicles including the vehicle-mounted fire control system of (1) or (1a), the fleet control system comprising: a first data array of cargo scheduled delivery locations, times, and quantities; a second data array of delivery vehicles and respective loads and delivery destinations of the delivery vehicles; and a computer system including the processor of (1) or (1a) in communication with a plurality of delivery vehicles, and programmed to update the first data array of delivery vehicles and their respective loads and delivery destinations, and issue revised delivery routing instructions to each vehicle based on changes in an accident or emergency status of any of the vehicles.

(13) The system of (12), wherein the processor determines if respective thresholds of a rollover sensor, an impact sensor, or a smoke detector are exceeded.

(14) The system of (13), wherein the roll-over sensor measures vertical and lateral accelerations of the vehicle.

(15) The system of (13), wherein a rollover threshold of the roll-over sensor comprises the vertical acceleration comprising at least one of 0.5, 1.0, 1.5, 2.0, 2.5. or 3.0 times the lateral acceleration.

(16) The system of (13), wherein the impact sensor measures an acceleration of the vehicle.

(17) The system of (16), wherein an impact threshold of the impact sensor comprises at least one of 0.5 g, 1.0 g, 1.5 g, or 2.0 g.

(18) The system of (12), further comprising a pressure sensor which senses an internal pressure of the liquid storage vessel, wherein the processor determines if a pressure threshold of the pressure sensor is exceeded; and issues said command upon exceeding the pressure threshold.

(19) The system of (12), wherein the processor comprises at least one of:
a data recording unit that saves sensor data to memory,
an audio broadcast system with prerecorded warning messages, and
a communication unit that automatically transmits sensor data to outside networks and locations upon issuance of said command.

(20) The system of (12), wherein the processor is programmed with an algorithm which upon execution performs at least one of the following functions:
monitors the storage vessel for fire risk with a smoke detector, wherein if a fire is detected the fire extinguisher is discharged and the event is recorded to hard memory;
monitors the storage vessel for crash impact, wherein if a g-force threshold of at least 1.0 g, 1.5 g, or 2.0 g is exceeded, the event is recorded to hard memory;
monitors the storage vessel for rollover, wherein if a g-force threshold of at least 0.5 g 1.0 g, 1.5 g, or 2.0 g is exceeded, the event is recorded to hard memory;
activates the vehicle's hazard lights;
broadcasts an audible warning to the driver and bystanders outside the vehicle;
transmits an emergency signal to a plurality of recipients when a fire, crash or rollover event is recorded to hard memory.

(21) A method for safe transport and management of a flammable liquid transported by a vehicle comprising a liquid storage vessel having an outer protective wall, a buffer space, and an interior wall, and one or more of a rollover sensor which measures a roll angle of the liquid storage vessel, an impact sensor which measures impact acceleration of the liquid storage vessel, a smoke detector, a fire extinguisher having a plurality of nozzles configured to spray fire suppressant at least onto one of the outer wall or the interior wall upon command, electrically actuated solenoids, each one in communication with the nozzles, configured to automatically open and spray fire suppressant upon command, and a processor in communication with one of the rollover sensor, the impact sensor, the smoke detector, and the solenoids, The method detects a hazard condition (fire or safety hazard) and issues the command upon detection of a the hazard condition.

As an alternative or in supplementation to statement (21), (21a) A method for safe transport and management of a flammable liquid transported by a vehicle comprising: a liquid storage vessel having an outer protective wall, a buffer space, and an interior wall; said outer protective wall enclosing the buffer space and the interior wall; at least one sensor which detects an abnormal state of the vehicle or the liquid storage vessel; a fire suppressant supply which sprays fire suppressant at least onto one of the outer wall or the interior wall upon command; and a processor in communication with the at least one sensor, the method includes detecting an abnormal condition and issuing the command upon detection of the abnormal condition (e.g., hazard, fire or safety hazard, roll over alert, impact, outer wall puncture, interior wall puncture, loss of pressure in the storage vessel, etc.).

(22) The method of (21), further comprising determining if respective thresholds of the rollover sensor, the impact sensor, or the smoke detector are exceeded; and issuing said command upon exceeding any of the respective thresholds.

(23) The method of (22), wherein the roll-over sensor measures vertical and lateral accelerations of the vehicle.

(24) The method of (23), wherein a rollover threshold of the rollover sensor comprises the vertical acceleration comprising at least one of 0.5, 1.0, 1.5, 2.0, 2.5. or 3.0 times the lateral acceleration.

(25) The method of (23), wherein the impact sensor measures an acceleration of the vehicle.

(26) The system of (25), wherein an impact threshold of the impact sensor comprises at least one of 0.5 g, 1.0 g, 1.5 g, or 2.0 g.

(27) The method of (21), providing upon said command a pressurized inert gas source to the buffer space.

(28) The method 2 of (21), further comprising sensing an internal pressure of the liquid storage vessel, and if a pressure threshold of the pressure sensor is exceeded; issuing said command.

(29) The method of (21), further comprising at least one of:
saving sensor data to memory,
storing for broadcast prerecorded warning messages, and
automatically transmitting sensor data to outside networks and locations upon issuance of said command.

(30) The method of (31), further comprising at least one of:
monitoring the storage vessel for fire risk with a smoke detector, wherein if a fire is detected the fire extinguisher is discharged and the event is recorded to hard memory;
monitoring the storage vessel for crash impact, wherein if a g-force threshold of at least 1.0 g, 1.5 g, or 2.0 g is exceeded, the event is recorded to hard memory;
monitoring the storage vessel for rollover, wherein if a g-force threshold of at least 0.5 g 1.0 g, 1.5 g, or 2.0 g is exceeded, the event is recorded to hard memory;
activating the vehicle's hazard lights;
broadcasting an audible warning to the driver and bystanders outside the vehicle;
transmitting an emergency signal to a plurality of recipients when a fire, crash or rollover event is recorded to hard memory.

(31) The method of (30), further comprising at least one of:
monitoring the storage vessel for fire risk with a smoke detector, wherein if a fire is detected the fire extinguisher is discharged, an emergency pressure relief solenoid is activated and the event is recorded to hard memory;
monitoring the storage vessel for explosive risk with a pressure sensor, wherein if the internal pressure inside the storage vessel reaches a predetermined threshold, an emergency pressure relief solenoid is activated and the event is recorded to hard memory;
monitoring the storage vessel for crash impact, wherein if a g-force threshold of at least 1.0 g, 1.5 g, or 2.0 g is exceeded, the event is recorded to hard memory;
monitoring the storage vessel for rollover, wherein if a g-force threshold of at least 0.50 g, 1.0 g, 1.5 g, or 2.0 g is exceeded, the event is recorded to hard memory;
activating the vehicle's hazard lights;
broadcasting an audible warning to the driver and bystanders outside the vehicle;
transmitting an emergency signal to a plurality of recipients if a fire, crash or rollover event is recorded to hard memory.

LEGEND

DESCRIPTION
2 Truck
4 Double walled liquid storage unit
6 Storage vessel
8 Outer protective wall
10 Vessel supports
12 Buffer space
14 Flame screen
15 Liquid absorbent mat
16 Fire extinguisher reservoir
18 Fire extinguisher nozzle
20 Smoke detector
22 Solenoid valve
24 Impact sensor
26 Rollover sensor
28 Data storage unit
30 Wireless transmission unit
36 Storage vessel valve
38 Pressure vessel valve
40 Pressure sensor
42 Pressure sensor
50 Emergency solenoid
54 Double walled gaseous storage unit
56 Pressure vessel
1201 Computer system
1202 Bus
1203 Internal processor
1204 Memory
1205 Read Only Memory (ROM)
1206 Not referenced in spec
1207 Hard disk
1208 Removable media drive
1209 Not referenced in spec
1213 Communication interface
1214 Network link
1215 Local Area Network (LAN)
1216 Communications network
1217 Input device

The invention claimed is:
1. A vehicle-mounted fire control system for safe transport and management of a flammable liquid transported by a vehicle, comprising:
a liquid storage vessel having an outer protective wall, a buffer space, and an interior wall;

said outer protective wall enclosing the buffer space and the interior wall;

a flame screen disposed between the buffer space and the outside atmosphere;

a rollover sensor which measures a roll angle of the liquid storage vessel;

an impact sensor which measures impact acceleration of the liquid storage vessel;

a smoke detector located inside the buffer space;

a fire extinguisher having a plurality of nozzles configured to spray fire suppressant at least onto one of the outer wall or the interior wall upon command;

electrically actuated solenoids, each one in communication with the nozzles, configured to automatically open and spray fire suppressant upon said command; and a processor in communication with the rollover sensor, the impact sensor, the smoke detector, and the solenoids, and said processor programmed to issue said command upon detection of a hazard.

2. The system of claim 1, wherein the processor determines if respective thresholds of the rollover sensor, the impact sensor, or the smoke detector are exceeded; and issues said command upon exceeding any of the respective thresholds.

3. The system of claim 2, wherein the roll-over sensor measures vertical and lateral accelerations of the vehicle.

4. The system of claim 3, wherein a rollover threshold of the rollover sensor comprises the vertical acceleration comprising at least one of 0.5, 1.0, 1.5, 2.0, 2.5, or 3.0 times the lateral acceleration.

5. The system of claim 3, wherein the impact sensor measures an acceleration of the vehicle.

6. The system of claim 5, wherein an impact threshold of the impact sensor comprises at least one of 0.5 g, 1.0 g, 1.5 g, or 2.0 g.

7. The system of claim 1, further comprising:
a pressurized inert gas source in fluid communication with the buffer space.

8. The system of claim 1, further comprising:
a pressure sensor which senses an internal pressure of the liquid storage vessel,
wherein the processor determines if a pressure threshold of the pressure sensor is exceeded; and issues said command upon exceeding the pressure threshold.

9. The system of claim 1, wherein the processor comprises
a data recording unit that saves sensor data to memory,
an audio broadcast system with prerecorded warning messages, and
a communication unit that automatically transmits sensor data to outside networks and locations upon issuance of said command.

10. The system of claim 1, wherein the processor is programmed with an algorithm which upon execution performs the following functions:
monitors the storage vessel for fire risk with a smoke detector, wherein if a fire is detected the fire extinguisher is discharged and the event is recorded;
monitors the storage vessel for crash impact, wherein if a g-force threshold of at least 1.0 g, 1.5 g, or 2.0 g is exceeded, the event is recorded;
monitors the storage vessel for rollover, wherein if a g-force threshold of at least 0.5 g 1.0 g, 1.5 g, or 2.0 g is exceeded, the event is recorded;
activates vehicle hazard lights;
broadcasts an audible warning to the driver and bystanders outside the vehicle;
transmits an emergency signal to a plurality of recipients when a fire, crash or rollover event is recorded.

11. The system of claim 1, wherein the processor is programmed with an algorithm which upon execution performs the following functions:
monitors the storage vessel for fire risk with a smoke detector, wherein if a fire is detected the fire extinguisher is discharged, an emergency pressure relief solenoid is activated and the event is recorded to hard memory;
monitors the storage vessel for explosive risk with a pressure sensor, wherein if the internal pressure inside the storage vessel reaches a predetermined threshold, an emergency pressure relief solenoid is activated and the event is recorded;
monitors the storage vessel for crash impact, wherein if a g-force threshold of at least 1.0 g, 1.5 g, or 2.0 g is exceeded, the event is recorded;
monitors the storage vessel for rollover, wherein if a g-force threshold of at least 0.50 g, 1.0 g, 1.5 g, or 2.0 g is exceeded, the event is recorded;
activates vehicle hazard lights;
broadcasts an audible warning to the driver and bystanders outside the vehicle;
transmits an emergency signal to a plurality of recipients if a fire, crash or rollover event is recorded.

12. A fleet control system for control of a fleet of delivery vehicles including the vehicle-mounted fire control system of claim 1, the fleet control system comprising
a first data array of cargo scheduled delivery locations, times, and quantities;
a second data array of delivery vehicles and respective loads and delivery destinations of the delivery vehicles; and
a computer system including the processor of claim 1 in communication with a plurality of delivery vehicles, and programmed to update the first data array of delivery vehicles and their respective loads and delivery destinations, and issue revised delivery routing instructions to each vehicle based on changes in an accident or emergency status of any of the vehicles.

13. The system of claim 12, wherein the processor determines if respective thresholds of a rollover sensor, an impact sensor, or a smoke detector are exceeded.

14. The system of claim 13, wherein the roll-over sensor measures vertical and lateral accelerations of the vehicle.

15. The system of claim 13, wherein a rollover threshold of the roll-over sensor comprises the vertical acceleration comprising at least one of 0.5, 1.0, 1.5, 2.0, 2.5. or 3.0 times the lateral acceleration.

16. The system of claim 13, wherein the impact sensor measures an acceleration of the vehicle.

17. The system of claim 16, wherein an impact threshold of the impact sensor comprises at least one of 0.5 g, 1.0 g, 1.5 g, or 2.0 g.

18. The system of claim 12, further comprising
a pressure sensor which senses an internal pressure of the liquid storage vessel,
wherein the processor determines if a pressure threshold of the pressure sensor is exceeded.

19. The system of claim 12, wherein the processor comprises:
a data recording unit that saves sensor data to memory,
an audio broadcast system with prerecorded warning messages, and
a communication unit that automatically transmits sensor data to outside networks and locations.

20. The system of claim 12, wherein the processor is programmed with an algorithm which upon execution performs the following functions:

monitors the storage vessel for fire risk with a smoke detector, wherein if a fire is detected the fire extinguisher is discharged and the event is recorded;

monitors the storage vessel for crash impact, wherein if a g-force threshold of at least 1.0 g, 1.5 g, or 2.0 g is exceeded, the event is recorded;

monitors the storage vessel for rollover, wherein if a g-force threshold of at least 0.5 g 1.0 g, 1.5 g, or 2.0 g is exceeded, the event is recorded;

activates vehicle's hazard lights;

broadcasts an audible warning to the driver and bystanders outside the vehicle;

transmits an emergency signal to a plurality of recipients when a fire, crash or rollover event is recorded.

\* \* \* \* \*